(12) United States Patent
Poyhonen et al.

(10) Patent No.: US 8,977,301 B2
(45) Date of Patent: Mar. 10, 2015

(54) SYSTEM AND METHOD FOR IMPLEMENTING A SELECTIVE PAGING MODEL FOR USE IN A MULTI-ACCESS ENVIRONMENT

(75) Inventors: Petteri Poyhonen, Helsinki (FI); Ove Strandberg, Lappböle (FI)

(73) Assignee: Nokia Corporation, Espoo (FI)

( * ) Notice: Subject to any disclaimer, the term of this patent is extended or adjusted under 35 U.S.C. 154(b) by 1284 days.

(21) Appl. No.: 11/609,835

(22) Filed: Dec. 12, 2006

(65) Prior Publication Data

US 2008/0139226 A1 Jun. 12, 2008

(51) Int. Cl.
*H04W 68/00* (2009.01)
*H04W 68/12* (2009.01)
*H04W 68/02* (2009.01)
*H04W 8/18* (2009.01)

(52) U.S. Cl.
CPC .............. *H04W 68/12* (2013.01); *H04W 68/02* (2013.01); *H04W 68/005* (2013.01); *H04W 8/18* (2013.01)
USPC ...................... 455/458; 455/422.1; 455/435.1; 455/509; 455/515; 370/329; 370/328

(58) Field of Classification Search
CPC .... H04W 68/02; H04W 68/00; H04W 68/005
USPC ........... 455/458, 432.1, 436, 426, 422.1, 434, 455/435.1, 509, 515; 370/331, 346, 259, 370/328, 329; 340/7.1
See application file for complete search history.

(56) References Cited

U.S. PATENT DOCUMENTS

| | | | | |
|---|---|---|---|---|
| 5,490,203 | A | * 2/1996 | Jain et al. | 455/435.1 |
| 6,810,259 | B1 | * 10/2004 | Zhang | 455/456.5 |
| 2003/0148777 | A1 | 8/2003 | Watanabe et al. | |
| 2004/0185879 | A1 | 9/2004 | Kong et al. | |
| 2005/0249131 | A1 | 11/2005 | Takahashi et al. | |
| 2007/0127498 | A1 | 6/2007 | Kim et al. | |
| 2008/0132234 | A1* | 6/2008 | Gilliland | 455/436 |

(Continued)

FOREIGN PATENT DOCUMENTS

| | | |
|---|---|---|
| EP | 1 531 645 A1 | 8/2003 |
| EP | 1339250 | 8/2003 |
| GB | 2418568 | 3/2006 |

(Continued)

OTHER PUBLICATIONS

Renker Liebsch, Paging Concept for IP based Networks Jun. 2001, Internet-Draft, 46 pages.*

(Continued)

*Primary Examiner* — Olumide T Ajibade Akonai
(74) *Attorney, Agent, or Firm* — Banner & Witcoff, Ltd.

(57) ABSTRACT

A system by which paging can be performed to support global reachability in a heterogeneous multi-access environment independently on a particular radio access network architecture. Various embodiments of the present invention provide methods for performing generic paging in heterogeneous multi-access networks based on incoming traffic and its characteristics, producing a topology-based coverage map of dynamic access networks. The framework of the various embodiments of the present invention supports the use of user preferences in the selective paging process; i.e. the most optimal radio access is activated according to user preferences and the current networking environment.

33 Claims, 3 Drawing Sheets

(56) References Cited

U.S. PATENT DOCUMENTS

2009/0017823 A1* 1/2009 Sachs et al. .................. 455/437
2009/0129357 A1* 5/2009 Isaac et al. .................... 370/342

FOREIGN PATENT DOCUMENTS

WO    WO 2004/091246    10/2004
WO    WO 2007/100300     9/2007

OTHER PUBLICATIONS

Soliman, HMIPv6 Aug. 2005, Network Working Group, RFC 4140, 25 pages.*

Liebsch et al., Paging concept for IP based networks <draft-renker-paging-ipv6-00.txt>IETF Standard-Working-Draft, Jun. 1, 2006. XP015034319.

International Search Report for PCT Application No. PCT/IB2007/055065.

Preliminary Report on Patentability in International Patent Application No. PCT/IB2007/055065, dated Jun. 25, 2009.

Chinese Patent Application No. 200780051185.7 Second Office Action dated Jun. 26, 2012, including English translation.

Office Action in Chinese patent application No. 200780051185.7, dated Aug. 25, 2011.

Extended European Search Report dated Jan. 4, 2012 in Application No. 07849462.2.

* cited by examiner

SYSTEM AND METHOD FOR IMPLEMENTING A SELECTIVE PAGING MODEL FOR USE IN A MULTI-ACCESS ENVIRONMENT

FIELD OF THE INVENTION

The present invention relates generally to radio access technologies (RATs). More particularly, the present invention relates to paging mechanisms for use with a wide variety of different RATs.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are used to provide communication services such as voice, packet data, etc. Wireless communication systems may comprise multiple-access systems that are capable of supporting multiple users by sharing available system resources. Examples of such access systems include Code Division Multiple Access (CDMA) systems, Time Division Multiple Access (TDMA) systems, and Frequency Division Multiple Access (FDMA) systems. A CDMA system may implement a RAT such as Wideband CDMA (W-CDMA), CDMA2000, etc. Typically, not all RATs have conventionally supported built-in paging mechanisms for providing reachability. Additionally, whenever paging mechanisms are supported, they are typically defined to be RAT-specific functions that are only used in legacy architectures. Furthermore, paging is also typically only incorporated for specific mobility arrangements; the inclusion of heterogeneous mobility arrangements into a common paging environment has not been conventionally implemented. Still further, clients that do not belong to a mobility system typically are not capable of entering into an idle mode without loosing IP connectivity and/or context.

In light of the above, it would be desirable to provide a system for enabling selective paging in a heterogeneous multi-access environment, supporting both mobile cellular and non-mobile cellular access.

SUMMARY OF THE INVENTION

The present invention provides a system by which paging can be performed to support global reachability in a heterogeneous multi-access environment independently on a particular radio access network architecture and its paging mechanism(s). The present invention provides methods for performing generic paging in heterogeneous multi-access networks based on incoming traffic and its characteristics, producing a topology-based coverage map of dynamic access networks. The framework of the various embodiments of the present invention supports the use of user preferences in the selective paging process; i.e. the most optimal radio access is activated according to user preferences and the current networking environment. Additionally, with the various embodiments of the present invention, relative coverage information can be gathered separately from the paging execution cycle.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

The present invention provides a system by which paging can be performed to support global reachability in a heterogeneous multi-access environment independently on a particular radio access network architecture and its paging mechanism(s). The present invention provides methods for performing generic paging in heterogeneous multi-access networks based on incoming traffic and its characteristics, producing a topology-based coverage map of dynamic access networks. This generic paging uses a radio access network-specific paging mechanism or mechanisms. The framework of the various embodiments of the present invention supports the use of user preferences in the selective paging process; i.e. the most optimal radio access is activated according to user preferences and the current networking environment. Additionally, with the various embodiments of the present invention, relative coverage information can be gathered separately from the paging execution cycle.

Figure 1:
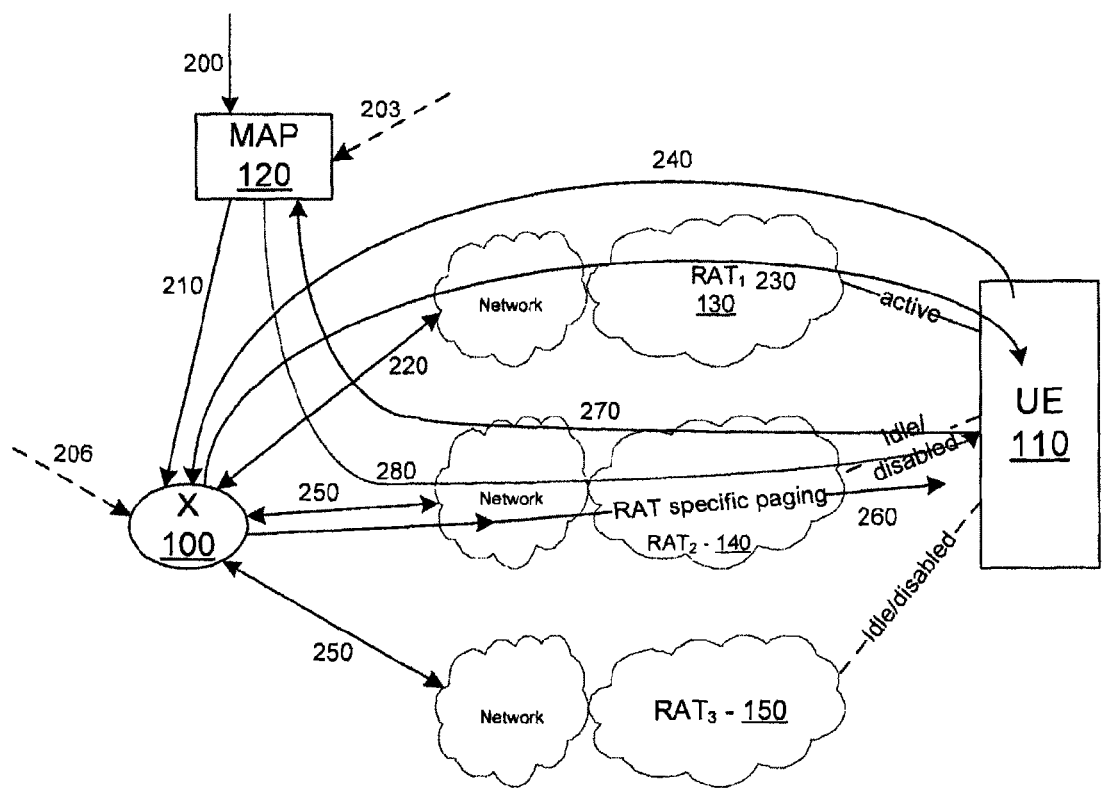
FIG. 1 is a depiction showing the function of a paging system in accordance with various embodiments of the present invention.

FIG. 1 is a depiction showing the function of a paging model constructed in accordance with various embodiments of the present invention. FIG. 1 shows how generic paging can be performed according various embodiments in heterogeneous multi-access networks based on incoming traffic and its characteristics, for example. FIG. 1 also shows how topology-based coverage maps of dynamic access networks may be produced according the embodiments of the present invention.

"X", represented at 100 in FIG. 1, is an external entity, from the point of view of the user equipment (UE) 110, that is aware of the relevant UE's logical and/or physical resources. A user also may control this external entity 100 and provide, for example, various user preferences and policies to control the behavior of the external entity 100. The UE 110 is also responsible for maintaining its "RAT status" in the external entity 100 so that, when needed, the external entity 100 is capable of contacting the UE 110. This status information may contain, for example, required contact address parameters.

As depicted in FIG. 1, the user's Mobile Anchor Point (MAP) 120 that provides a global Layer 3 (L3) reachability for the user is triggered either by a data packet intended for the user's UE 100 (represented at 200) or a control signal generated by an external control/user plane entity (represented at 203). Alternatively, the external entity that is aware of user's UE resources (such as the radio accesses which are supported by the UE 110, e.g., $RAT_2$ and $RAT_3$-related networks, identified herein at 140 and 150) may be also triggered by a control signal generated by an external control/user plane entity, as represented at 206.

At 210 in FIG. 1, the MAP 120 contacts the external entity 100 and requests that the external entity 100 activate one or more of the UE's radio accesses according to related preferences/policies. The MAP 120 may also provide additional information about the trigger. For example, if a received data packet was a trigger, then some information about traffic type could be provided to the external entity 100.

At 220 in FIG. 1, the external entity 100 is aware of the UE's active radio access (referred to herein as $RAT_1$) and contacts the $RAT_1$-related network 130 in order to request access to the UE 110. It should be noted that the identification of UE's 110 over different RATs can be performed, for example, in various RAT-specific ways. It should also be noted, that, depending on the nature of $RAT_1$, the UE's radio may be in an idle state, potentially requiring the first related network 130 to perform RAT0-specific paging to "wake up" the UE 110 and activate its $RAT_1$. The external entity 100 may also request the UE's current location info, a current signal power level for the UE 110, or other radio measurements. At this point, the external entity could request only a recent radio measurement, or a set of such measurements stored in the UE 110. A set of measurements could be used, for example, in order to determine how the measured radio signal strength has changed, e.g., whether it is decreasing or increasing. A set of measurements, along with location information from the UE 110 can also help to build up and maintain coverage maps; i.e. in loc(x,y), a certain RAT can possess an average signal strength of M'.

At 230, the external entity 100 sends a message to the UE 110 via the first related network 130, notifying the UE 110 that it should prepare itself for communication. If necessary, the external entity 100 may also ask for updated location information from the UE. The UE therefore enables other RATs at its disposal, designated herein as $RAT_2$ and $RAT_3$ as necessary. At 240, the UE 110 replies to the external entity, indicating that $RAT_2$ and $RAT_3$ are enabled.

At 250, the external entity 100 requests the $RAT_2$ and $RAT_3$-related networks 140 and 150 provide their current respective coverage maps, and the coverage maps are therefore provided to the external entity 100 in response. In a highly dynamic radio access network, this map can be formed based upon active nodes and their location and signal information. If necessary, the external entity 100 may request that the $RAT_2$-related network 140 activate the UE's radio access and, depending on the state of the UE's radio and the type of RAT, a RAT-specific paging may need to be performed. This is represented at 260.

If the UE's locator (i.e., its IP address) has changed due to the deployment of a new RAT, then at 270 it notifies its MAP 120 about this change in order to update the UE's reachability information. For example, if a MAP 120 represents a Home Agent of Mobile IPv6, then this notification may comprise a binding update message. At this point and as represented by 280, the MAP 120 is then capable of forwarding a received and buffered data packet to the UE 110 in the even that the original trigger comprised a data packet that was destined for the user's UE 110.

It should be noted that the example illustrated in FIG. 1 does not depict the use of local L3 mobility. However, the MAP 120 could be also used for local mobility management, in which case the MAP 120 provides for local L3 reachability instead of global reachability.

Figure 2:
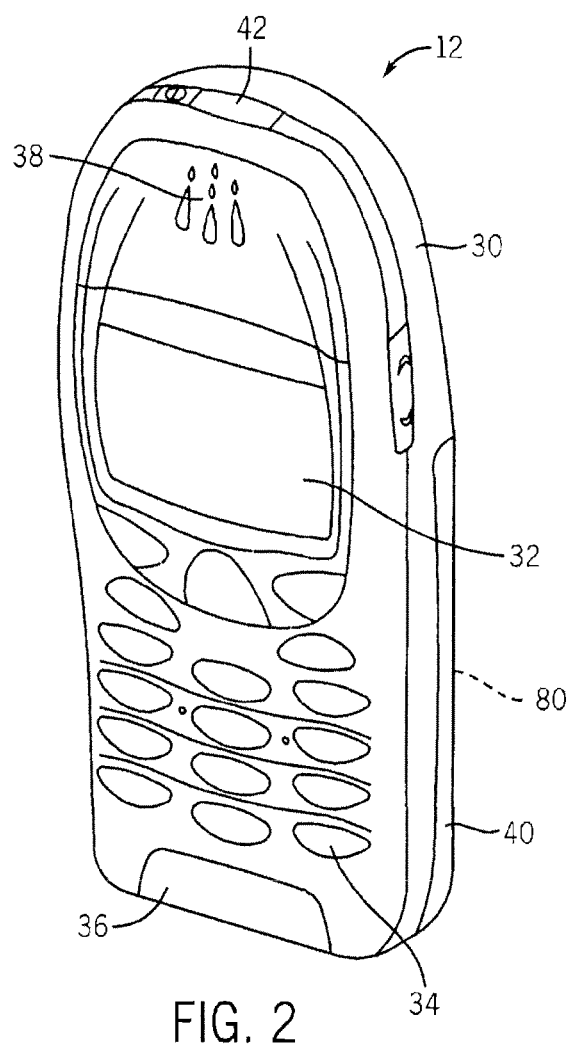
FIG. 2 is a perspective view of a mobile telephone that can be used in the implementation of the present invention.
Figure 3:
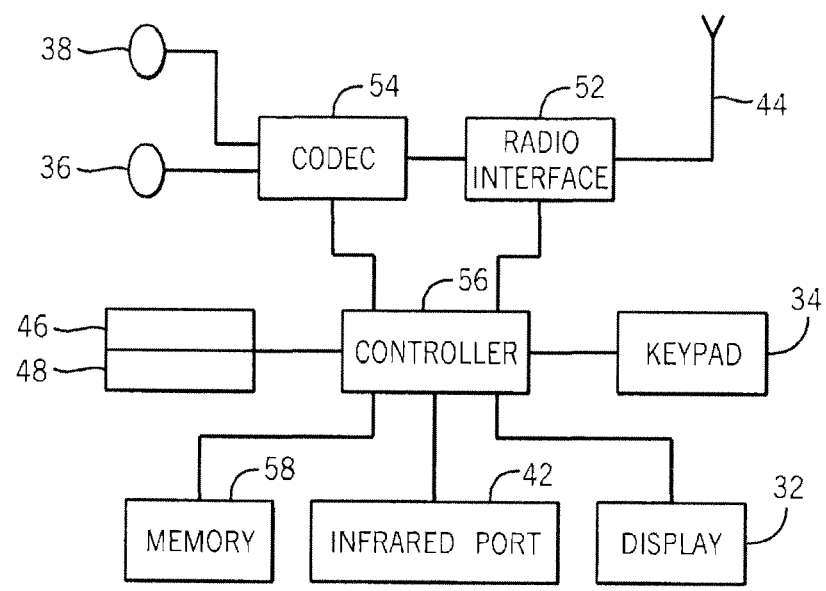
FIG. 3 is a schematic representation of the telephone circuitry of the mobile telephone of FIG. 2.

FIGS. 2 and 3 show one representative electronic device 12 within which the present invention may be implemented. It should be understood, however, that the present invention is not intended to be limited to one particular type of electronic device 12 or other electronic device. It should also be noted that the components described with regard to the electronic device could be incorporated as necessary into any of the devices necessary for the successful implementation of the present invention. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices used in the implementation of the present invention may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. A communication device may communicate using various media including, but not limited to, radio, infrared, laser, cable connection, etc.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   receiving, from a mobile anchor point (MAP) by an external entity able to selectively signal a user equipment item in a multi-access environment, a request instructing that the external entity cause the user equipment item to prepare to receive data from the MAP;
   identifying, by the external entity, an active radio access technology (RAT) for the user equipment item based on stored radio access information for the user equipment item;
   transmitting, from the external entity to a network that is able to communicate with the user equipment item via the active RAT, an indication that the user equipment item is to prepare to receive data from the MAP by activating two or more additional RATs;

transmitting, from the external entity to each of two or more additional networks that are able to respectively communicate with the user equipment item via a respective one of the two or more additional RATs, a request for information relating to the respective one of the two or more additional RATs;

receiving, from each of the two or more additional networks, the information relating to the respective one of the two or more additional RATs, resulting in information relating to the two or more additional RATs; and notifying, based on the information relating to the two or more additional RATs, the MAP of any changes in reachability information for the user equipment item.

2. The method of claim 1, wherein transmitting the indication that the user equipment item is to prepare to receive data from the MAP by activating the two or more additional RATs includes transmitting a request for location information of the user equipment item.

3. The method of claim 1, wherein transmitting the indication that the user equipment item is to prepare to receive data from the MAP by activating the two or more additional RATs includes transmitting a request for a radio signal measurement of the user equipment item.

4. The method of claim 3, wherein the radio signal measurement comprises a measurement of a current signal power level.

5. The method of claim 1, wherein transmitting the indication that the user equipment item is to prepare to receive data from the MAP by activating the two or more additional RATs includes transmitting a request for a set of radio signal measurements stored in the user equipment item.

6. The method of claim 1, further comprising receiving, by the external entity from the user equipment item, an indication that the two or more additional RATs are active.

7. The method of claim 1, wherein notifying the MAP of any changes in the reachability information for the user equipment item includes transmitting a binding update message to notify the MAP that an Internet Protocol (IP) address of the user equipment item has changed.

8. The method of claim 1, wherein the information relating to the two or more additional RATs comprises a current coverage map for each of the two or more additional RATs.

9. The method of claim 8, wherein the current coverage map for each of the two or more additional RATs comprises a map formed based on location and signal information for active nodes.

10. The method of claim 1, further comprising,
before transmitting the indication that the user equipment item is to prepare to receive data from the MAP by activating the two or more additional RATs, transmitting, by the external entity and to the network that is able to communicate with the user equipment item via the active RAT, a request to access the user equipment item, which causes the network that is able to communicate with the user equipment item via the active RAT to perform active RAT-specific paging to have the user equipment item transition from an idle state and activate radio access via the active RAT.

11. The method of claim 10, wherein the request instructing that the external entity cause the user equipment item to prepare to receive data from the MAP includes information indicating what caused the MAP to trigger transmission of the request instructing that the external entity cause the user equipment item to prepare to receive data from the MAP.

12. The method of claim 11, wherein the information indicating what caused the MAP to trigger transmission of the request instructing that the external entity cause the user equipment item to prepare to receive data from the MAP indicates that receipt of a data packet destined for the user equipment item by the MAP triggered transmission of the request instructing that the external entity cause the user equipment item to prepare to receive data from the MAP.

13. The method of claim 11, wherein the information indicating what caused the MAP to trigger transmission of the request instructing that the external entity cause the user equipment item to prepare to receive data from the MAP indicates that a control signal generated by another entity and received by the MAP triggered transmission of the request instructing that the external entity cause the user equipment item to prepare to receive data from the MAP.

14. The method of claim 1, wherein receiving, from each of the two or more additional networks, the information relating to the respective one of the two or more additional RATs includes receiving, separate from a paging execution cycle, the information relating to the respective one of the two or more additional RATs.

15. An apparatus comprising:
one or more processors; and
memory storing executable instructions that, when executed by the one or more processors, cause the apparatus to at least:
  receive, from a mobile anchor point (MAP), a request instructing that the apparatus cause a user equipment item, which is capable of being selectively signaled by the apparatus in a multi-access environment, to prepare to receive data from the MAP;
  identify an active radio access technology (RAT) for the user equipment item based on stored radio access information for the user equipment item;
  transmit, to a network that is able to communicate with the user equipment item via the active RAT, an indication that the user equipment item is to prepare to receive data from the MAP by activating two or more additional RATs;
  transmit, to each of two or more additional networks that are able to respectively communicate with the user equipment item via a respective one of the two or more additional RATs, a request for information relating to the respective one of the two or more additional RATs;
  receive, from each of the two or more additional networks, the information relating to the respective one of the two or more additional RATs, resulting in information relating to the two or more additional RATs; and
  notify, based on the information relating to the two or more additional RATs, the MAP of any changes in reachability information for the user equipment item.

16. The apparatus of claim 15, wherein causing the apparatus to transmit the indication that the user equipment item is to prepare to receive data from the MAP by activating the two or more additional RATs includes causing the apparatus to transmit a request for location information for of the user equipment item.

17. The apparatus of claim 15, wherein causing the apparatus to transmit the indication that the user equipment item is to prepare to receive data from the MAP by activating the two or more additional RATs includes causing the apparatus to transmit a request for a radio signal measurement of the user equipment item.

18. The apparatus of claim 17, wherein the radio signal measurement comprises a measurement of a current signal power level.

19. The apparatus of claim 15, wherein causing the apparatus to transmit the indication that the user equipment item is to prepare to receive data from the MAP by activating the two or more additional RATs includes causing the apparatus to transmit a request for a set of radio signal measurements stored in the user equipment item.

20. The apparatus of claim 15, wherein the executable instructions, when executed by the one or more processors, cause the apparatus to:
receive, from the user equipment item, an indication that the two or more additional RATs are active.

21. The apparatus of claim 15, wherein causing the apparatus to notify the MAP of any changes in the reachability information for the user equipment item includes causing the apparatus to transmit a binding update message to notify the MAP that an Internet Protocol (IP) address of the user equipment item has changed.

22. The apparatus of claim 15, wherein the information relating to the two or more additional RATs comprises a current coverage map for each of the two or more additional RATs.

23. The apparatus of claim 22, wherein the current coverage for each of the two or more additional RATs comprises a map formed based on location and signal information for active nodes.

24. The apparatus of claim 22, wherein the executable instructions, when executed by the one or more processors, cause the apparatus to:
before transmitting the indication that the user equipment item is to prepare to receive data from the MAP by activating the two or more additional RATs, transmit, to the network that is able to communicate with the user equipment item via the active RAT, a request to access the user equipment item, which causes the network that is able to communicate with the user equipment item via the active RAT to perform active RAT-specific paging to have the user equipment item transition from an idle state and activate radio access via the active RAT.

25. The apparatus of claim 15, wherein the request instructing that the apparatus cause the user equipment item to prepare to receive data from the MAP includes information indicating what caused the MAP to trigger transmission of the request instructing that the apparatus cause the user equipment item to prepare to receive data from the MAP.

26. The apparatus of claim 25, wherein the information indicating what caused the MAP to trigger transmission of the request instructing that the apparatus cause the user equipment item to prepare to receive data from the MAP indicates that receipt of a data packet destined for the user equipment item by the MAP triggered transmission of the request instructing that the apparatus cause the user equipment item to prepare to receive data from the MAP.

27. The apparatus of claim 25, wherein the information that caused the MAP to trigger transmission of the request instructing that the apparatus cause the user equipment item to prepare to receive data from the MAP indicates that a control signal generated by another entity and received by the MAP triggered transmission of the request instructing that the apparatus cause the user equipment item to prepare to receive data from the MAP.

28. The apparatus of claim 15, wherein causing the apparatus to receive, from each of the two or more additional networks, the information relating to the respective one of the two or more additional RATs includes causing the apparatus to receive, separate from a paging execution cycle, the information relating to the respective one of the two or more additional RATs.

29. A memory storing executable instructions that, when executed, cause an apparatus to at least:
receive, from a mobile anchor point (MAP), a request instructing that the apparatus cause a user equipment item, which is capable of being selectively signaled by the apparatus in a multi-access environment, to prepare to receive data from the MAP;
identify an active radio access technology (RAT) for the user equipment item based on stored radio access information for the user equipment item;
transmit, to a network that is able to communicate with the user equipment item via the active RAT, an indication that the user equipment item is to prepare to receive data from the MAP by activating two or more additional RATs;
transmit, to each of two or more additional networks that are able to respectively communicate with the user equipment item via a respective one of the two or more additional RATs, a request for information relating to the respective one of the two or more additional RATs;
receive, from each of the two or more additional networks, the information relating to the respective one of the two or more additional RATs, resulting in information relating to the two or more additional RATs; and
notify, based on the information relating to the two or more additional RATs, the MAP of any changes in reachability information for the user equipment item.

30. A system comprising:
a user equipment item configured to communicate, using a plurality of radio access technologies (RATs), with other devices via a plurality of networks in a multi-access environment;
an external entity configured to selectively signal the user equipment item in the multi-access environment; and
a mobile anchor point (MAP) configured to communicate with the external entity,
wherein the external entity is further configured to:
receive, from the MAP, a request instructing that the external entity cause the user equipment item to prepare to receive data from the MAP,
identify an active radio access technology (RAT) for the user equipment item based on stored radio access information for the user equipment item,
transmit, to a network that is able to communicate with the user equipment item via the active RAT, an indication that the user equipment item is to prepare to receive data from the MAP by activating two or more additional RATs, wherein the network is from the plurality of networks,
transmit, to each of two or more additional networks that are able to respectively communicate with the user equipment item via a respective one of the two or more additional RATs, a request for information relating to the respective one of the two or more additional RATs, wherein the two or more networks are from the plurality of networks,
receive, from each of the two or more additional networks, the information relating to the respective one of the two or more additional RATs, resulting in information relating to the two or more additional RATs; and notify, based on the information relating to the two or more additional RATs, the MAP of any changes in reachability information for the user equipment item.

31. The system of claim 30, wherein the information relating to the two or more additional RATs comprises a current coverage map for each of the two or more additional RATs.

32. A method comprising:
identifying, by an external entity able to selectively signal a user equipment item in a multi-access environment, an active radio access technology (RAT) for the user equipment item based on stored radio access information for the user equipment item;
transmitting, from the external entity to a network that is able to communicate with the user equipment item via the active RAT, an indication that the user equipment item is to prepare to receive data from a mobile anchor point (MAP) by activating two or more additional RATs; and
receiving, from each of two or more additional networks that are able to respectively communicate with the user equipment item via a respective one of the two or more additional RATs, information relating to the respective one of the two or more additional RATs.

33. An apparatus comprising:
one or more processors; and
memory storing executable instructions that, when executed by the one or more processors, cause the apparatus to at least:
identify, based on stored radio access information for a user equipment item, an active radio access technology (RAT) for the user equipment item, which is capable of being selectively signaled by the apparatus in a multi-access environment;
transmit, to a network that is able to communicate with the user equipment item via the active RAT, an indication that the user equipment item is to prepare to receive data from a mobile anchor point (MAP) by activating two or more additional RATs; and
receive, from each of two or more additional networks that are able to respectively communicate with the user equipment item via a respective one of the two or more additional RATs, information relating to the respective one of the two or more additional RATs.

* * * * *

UNITED STATES PATENT AND TRADEMARK OFFICE
CERTIFICATE OF CORRECTION

PATENT NO. : 8,977,301 B2  Page 1 of 1
APPLICATION NO. : 11/609835
DATED : March 10, 2015
INVENTOR(S) : Poyhonen et al.

It is certified that error appears in the above-identified patent and that said Letters Patent is hereby corrected as shown below:

In the claims

In Column 6, Claim 16, Line 60
Please delete "information for of the user" and replace with --information of the user--.

Signed and Sealed this
Sixth Day of October, 2015

Michelle K. Lee
*Director of the United States Patent and Trademark Office*